Patented Mar. 26, 1929.

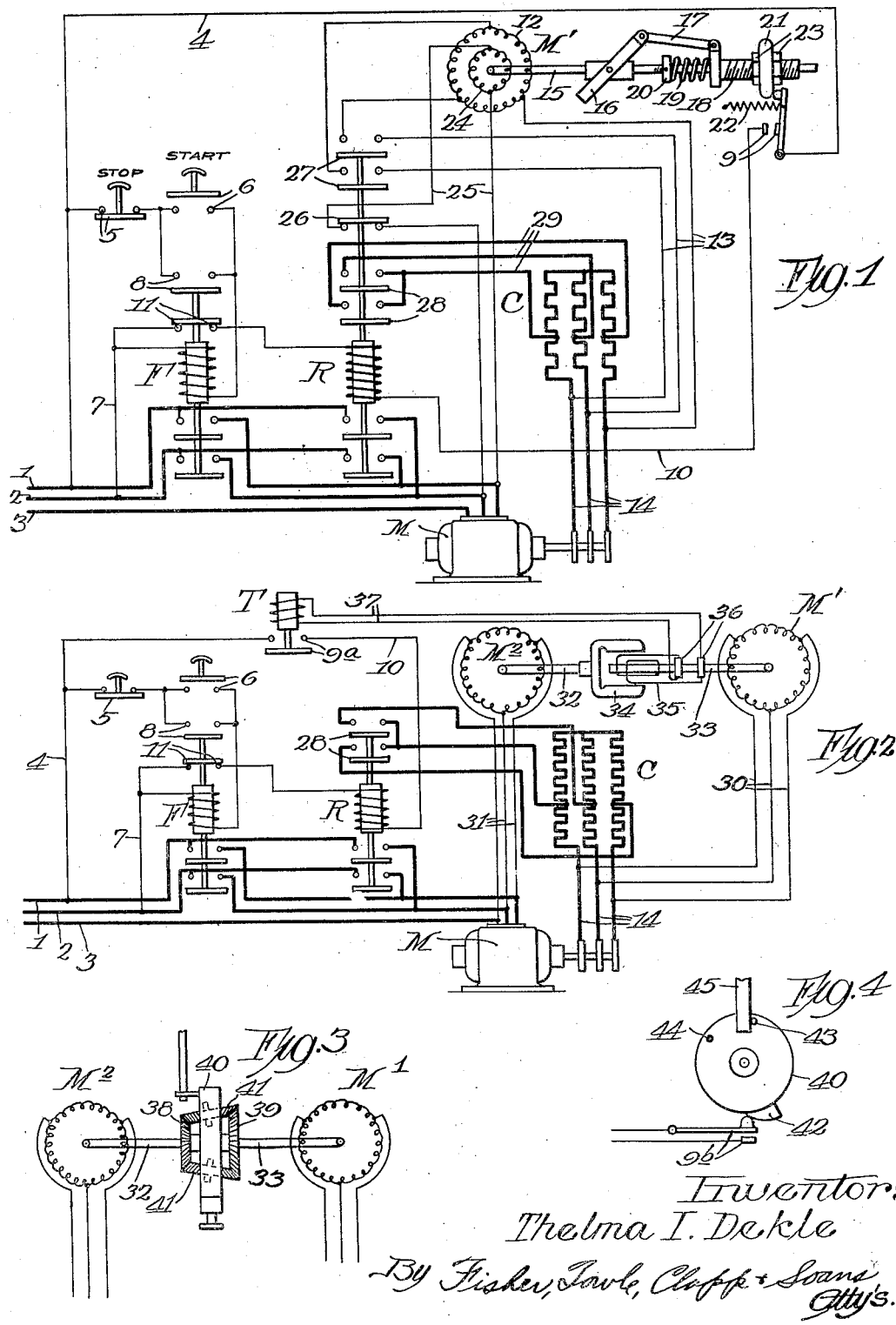

1,706,443

UNITED STATES PATENT OFFICE.

THELMA I. DEKLE, OF CHICAGO, ILLINOIS, ASSIGNOR TO CLINE ELECTRIC MANUFACTURING COMPANY, OF CHICAGO, ILLINOIS, A CORPORATION OF ILLINOIS.

CONTROLLER FOR ALTERNATING-CURRENT MOTORS.

Application filed October 17, 1925. Serial No. 63,045.

The invention relates to controllers for alternating current motors, and more particularly to means for applying an electrodynamic braking effect for quickly stopping the motor.

With alternating current or induction motors difficulty has been encountered in obviating the use of a brake for stopping the motor since if sufficient reverse electromagnetic torque is applied to the motor to quickly stop it, the retarding current cannot readily be cut off with certainty when the motor is brought to rest, and hence the retarding current is apt to reverse the motor. If the electromagnetic torque applied is so small that it will not reverse the motor, it will not of course quickly stop it.

The present invention seeks to provide improved means for applying a retarding current or reverse electromagnetic torque to an alternating current or induction motor which will quickly stop it and which will also cut off the retarding current with certainty when the speed of the motor is reduced substantially to zero. A further object of the invention is to provide an auxiliary control motor relay or rotary relay having a rotor governed in speed by the secondary frequency of the main driving motor, together with means operated by the rotor of the auxiliary motor for controlling the circuit of the main motor and particularly for opening the circuit of the main motor when the latter is brought to rest by the application of a retarding current. With these and other objects in view the invention consists in the features of improvement hereinafter more completely set forth, illustrated in preferred forms in the accompanying drawings, and more particularly pointed out in the appended claims.

In the drawings:

Fig. 1 is a diagrammatic illustration of one embodiment of the present invention.

Fig. 2 is a similar illustration of a modified form.

Figs. 3 and 4 are detail views illustrating annother modification.

The controlling devices for the induction motor M includes suitable switch means for controlling the motor circuit to apply a forward operating or reverse electromagnetic torque to the motor. In the arrangement shown, forward and reverse electromagnetic switches F and R are provided having normally open contacts interposed, as usual, in the main line conductors 1, 2 and 3, and adapted, when actuated, to apply either a forward operating or a reverse retarding current to the motor.

The circuit of the electromagnetic forward switch F can be controlled in any usual or suitable manner, but in the preferred arrangement shown the circuit of the forward switch F extends from one of the main line conductors 1 by a conductor 4 through the normally closed contacts 5 of a "stop" push button switch and through the normally open contacts 6 of a "start" push button switch, thence to the energizing coil of the switch F, and thence by a conductor 7 to the main line conductor 2. The switch F is provided as usual with normally open contacts 8 which, when the switch is energized, close a short circuit around the starting switch, so that the switch F remains energized until the "stop" push button is operated to open its circuit.

Means are provided whereby the reversing switch R is energized when the forward switch F is de-energized to thereby change the connections of the line conductors 1, 2 and 3, to the motor and apply a retarding current. Means is also provided for opening the circuit of the reversing switch and cutting off the retarding current when the speed of the motor is reduced to zero, such cutting off means being under control of a small auxiliary rotary motor M', the speed of which is responsive to the secondary frequency of the main driving motor. In the arrangement shown the energizing circuit of the reversing switch extends from the supply conductor 4, through normally open contacts 9, thence by a conductor 10 through the coil of the reversing switch and through normally closed contacts 11 of the switch F to the return conductor 7 of the controlling circuits. The contacts 9 are opened and closed by the rotary means operated by the auxiliary control motor M' and the contacts 11, which are operated by the forward switch F, to serve to close the circuit of the reversing switch R when the forward switch is de-energized.

The auxiliary control motor M' may be of the squirrel-cage induction type or it may be a synchronous motor. Its main winding 12 is connected by conductors 13 and 14 to the secondary of the main driving motor. Preferably the winding 12 is such that the rotor speed produced thereby is directly proportional to the secondary frequency developed in the main motor, the winding having the same number of poles as the main motor. As is well known, if the main motor is locked and its circuit closed, it would act as a transformer and induce a current of normal voltage and normal frequency in its secondary circuit. Thus, in the case of a 60-cycle motor there would then be a current of 60 cycles developed in the secondary. If such a motor is released and allowed to come up to speed there would be theoretically a current of 30 cycles in the secondary when the motor is running at half speed and of zero cycles when the motor is running at synchronous speed, but, due to the necessary slip of the induction motor, there would be a current of 3 or 4 cycles in the secondary circuit when the motor is running at normal speed. If, when the motor is running in forward direction at normal speed, the circuit connections are changed to apply a reverse electrodynamic torque, the secondary frequency would then theoretically be twice the normal frequency of the supply current. Then, if it be assumed that the main and auxiliary motors are 6 pole, 60-cycle motors, the normal running speed of the main motor would be approximately 1200 revolutions per minute, and if its main circuit connections are changed, as it is when the switch F is de-energized and the switch R energized, the secondary frequency would theoretically be 120 cycles and the speed of the auxiliary motor 2400 revolutions per minute. Practically, however, due to the delay in time in reversing the circuit connections of the motor, the secondary frequency and the speed of the auxiliary motor would be somewhat less than double the normal frequency and speed. Then as the speed of the driving motor is reduced, the secondary frequency and the speed of the auxiliary motor will be correspondingly reduced and, when the main motor is brought to rest, the speed of the auxiliary motor will be substantially normal or 1200 revolutions per minute. In this way the auxiliary motor can detect with certainty the moment when the speed of the main motor is decelerated substantially to zero, and hence can be employed to operate means whereby the retarding current is cut off when the main driving motor is brought to rest.

In the form shown in Fig. 1, the control contacts 9 in the circuit of the reversing switch form the contacts of a centrifugal switch the rotary member of which are driven by the rotor 15 of the auxiliary motor. Different types of centrifugal switches can be employed. That shown comprises a weighted ring 16 pivotally mounted on the rotor or shaft 15 of the auxiliary motor to swing to and from a position at right angles to the shaft. The ring is connected by a link 17 to a sleeve 18 rotatable with the shaft and also slidable thereon, and a spring 19 coiled about the shaft and extending between the sleeve and a collar 20, normally holds the parts in the position shown with the sleeve 18 at the right hand limit of its movement. A collar 21 on the sleeve 18 normally engages one of the contacts 9 and holds these contacts open against the tension of a spring 22. Preferably, as shown, the collar 20 is threaded on the shaft to adjust the tension of the spring 19 and the collar 21 is held in adjusted position on the sleeve 18 by means of nuts 23 threaded on the sleeve.

With this arrangement, if the rotor of the auxiliary motor is always under control of its winding 12 that is connected to the secondary of the main motor, the contacts will be closed when the speed of the auxiliary motor exceeds normal and will be opened when the speed of the auxiliary motor is reduced to normal or substantially so. In operation, under such circumstances, the contacts 9 and 11 will be opened when the main driving motor is running in forward direction but will be closed when the circuit connections are changed to apply a retarding current to the main driving motor. Then, when the main motor is brought to rest, the contacts 9 will be opened to de-energize the switch R and so open the motor circuit with certainty at this point. It is noted that when the centrifugal switch operates under control of the auxiliary motor to cut off the retarding current, it is rotating at substantially normal speed and hence its operation is definite and certain. If, however, the centrifugal switch were driven from the main motor it would have to operate at very low or zero speed and its operation would then be uncertain.

It is desirable to quickly close the control contacts 9 when the switch F is energized to effect the rotation of the driving motor in forward direction, since otherwise the operation of the centrifugal switch mechanism might be somewhat uncertain if the circuit connections of the motor are reversed before the driving motor comes up to normal speed. For this purpose, the supplemental motor is provided with a second winding 24 connected by conductors 25 to the primary of the main motor and the reversing switch R is provided with normally closed contacts 26 in the circuit of the winding 24 and with normally open contacts 27 in the circuit of the winding 12. Preferably, the winding 24 has four poles and with the arrangement shown will operate the rotor of the auxiliary motor at a speed fifty per cent above normal, when the circuit of the main motor is closed for operation in forward direction. Thereby the centrifugal devices will quickly shift the collar 21 and permit the setting or closing of the control contacts 9 by the spring 22, when the circuit of the driving motor is closed for normal operation. Then, when the circuit connections are changed by de-energizing the switch F and energizing the switch R, the circuit of the auxiliary motor winding 24 is opened and that of its winding 12 closed, so that the centrifugal switch mechanism will respond in speed as described to the secondary frequency of the driving motor and so serve to cut off the retarding current at the moment the driving motor is brought to rest.

Means are also preferably provided whereby an electrodynamic torque of predetermined amount is applied to the motor to stop it. For this purpose the reversing switch R is provided with contacts 28 which serve to interpose a predetermined amount of resistance in the secondary circuit of the driving motor. When this switch is energized, the contacts 28 are connected by conductors 29 to definite points on a controlling resistance C which is connected to the secondary of the driving motor by the conductors 14. The resistance C may be also employed in the usual way for controlling the speed of the driving motor.

Obviously, the windings 12 and 24 of the auxiliary motor means can be arranged in two different motors having their rotors connected to the same shaft, or a single motor can be provided with both windings. Other changes may be made and the circuit of the main driving motor otherwise controlled by the auxiliary motor. In the arrangement shown in Fig. 2, the auxiliary control mechanism comprises two motors M' and M² connected respectively to the secondary and primary of the main driving motor by conductors 30 and 31, the arrangement being such that the motor M' is responsive in speed to the secondary of the driving motor and the motor M² operates as a synchronous motor and is responsive in speed to the normal frequency of the supply current. The motors M' and M² are connected electrically by providing the shafts 32 and 33 thereof, one with a permanent or an electromagnet 34 and the other with a coil or winding 35 connected to collector rings 36. The magnet 34 and coil 35 form the field and winding respectively of a direct current generator or magneto and the winding is connected by the collector rings 36 and conductors 37 to the energizing coil of a trip relay T. The latter controls normally open contacts 9' which, like the contacts 9 in the form shown in Fig. 1, are interposed in the energizing circuit of the reversing switch R. The other contacts and circuits are like those previously described in connection with the arrangement shown in Fig. 1.

With this arrangement when the circuit connections are changed as described, to apply a retarding current to the motor, the motor M² and field magnet 34 will rotate at normal speed and the motor M' and coil 35 at substantially twice normal speed and the current thus developed will energize the relay T and close the contacts 9'. Then when the main driving motor M is brought to rest, the speed of the control motor M' is reduced substantially to normal and the winding 35 and the field magnet 34 would then rotate at the same speed. Hence, relay T would be de-energized to open the contacts 9' and cut off the supply of retarding current to the driving motor.

Similarly arranged auxiliary motors M' and M² can be mechanically connected by differential gearing, a member of which is arranged to open and close control contacts in the circuit of the reversing switch. Such an arrangement is shown in Figs. 3 and 4 in which the shafts 32 and 33 of the auxiliary motors are connected to the driving gears 38 and 39 of a differential gearing, such gearing having a rotatable driven member 40 carrying pinions or gears 41 that mesh with the driving gears 38 and 39. The member 40 is provided with a cam lug 42 which closes and opens control contacts 9ᵇ. The member 40 is also provided with projecting pins 43 and 44 which are arranged to engage a fixed stop 45. Normally the pin 43 engages the stop and the contacts 9ᵇ are open. During normal forward operation of the main motor, the synchronous control motor M² will tend to rotate the member 40 in right hand direction and will maintain it in position with its pin 44 engaging the stop 45 and the contacts 9ᵇ closed. During such normal operation, the motor M¹ which is responsive in speed to the secondary frequency of the driving motor runs at very slow speed and does not influence the position of the member 40.

Then when the circuits of the driving and auxiliary motors are reversed, the speed of the motor M¹ will be nearly twice normal speed and its influence upon the member 40 will predominate and still hold it in its shifted position with the contacts 9ᵇ closed and will continue to do so until its speed is reduced substantially to normal and at which point the main driving motor is brought to rest. The differential gearing is so related that when this point is reached the influence of the synchronous motor M² upon the member 40 will predominate and move it backward or in counter-clockwise direction to open the contacts 9ᵇ.

While the improved auxiliary control motor or rotary relay is particularly effective for opening the circuit of a main motor when its speed is reduced to a predetermined point or zero by the application of a retarding current, it may be applied to advantage to otherwise control the circuit of a main motor at a predetermined point in the speed of the main motor. Obviously, other changes may be made in the details set forth without departure from the scope of the invention as defined in the appended claims.

I claim as my invention:

1. In combination, an electric driving motor, means for applying a retarding current to the motor, an auxiliary rotary control motor connected in circuit with the driving motor and means controlled by the speed of the rotor of the auxiliary motor for cutting off the retarding current.

2. In combination, an induction driving motor, means for reversing the electro-dynamic torque of the motor to stop it and means for opening the circuit of the motor when its speed has been reduced to a predetermined limit, said means including an auxiliary rotary motor responsive in speed to the secondary frequency of the driving motor.

3. In combination, an induction driving motor, an auxiliary rotary motor having a winding connected in circuit with the secondary of the driving motor, starting and stopping switch means operable at will, and contacts and circuit connections controlled by said switch means and the speed of the rotor of said auxiliary motor for supplying a retarding current to the driving motor to stop it and for opening the circuit of the driving motor when its speed has been reduced substantially to zero.

4. In combination, in induction driving motor, an auxiliary rotary motor responsive in speed to the secondary frequency of the driving motor, two electromagnetic switches for supplying operating and retarding current respectively to the driving motor, and contacts and circuit connections controlled in part by the auxiliary motor for automatically energizing the retarding switch when the operating switch is deenergized and for deenergizing the retarding switch when the speed of the driving motor is reduced to a predetermined limit.

5. In combination, an induction driving motor, an auxiliary rotary motor responsive in speed to the secondary frequency of the driving motor, electro-magnetic forward and reversing switches in the circuit of the driving motor, manually operable contacts controlling the forward switch, and contacts operated by the latter and by the auxiliary motor for controlling the reversing switch.

6. In combination, an induction driving motor, an auxiliary rotary motor responsive in speed to the secondary frequency of the driving motor, electro-magnetic forward and reversing switches in the circuit of the driving motor, start and stop push-button switches controlling the circuit of the forward switch, and contacts operated by the forward switch and by the auxiliary motor for automatically controlling the circuit of the reversing switch and whereby the latter is energized when the forward switch is deenergized, and is deenergized when the speed of the driving motor is reduced substantially to zero.

7. In combination, an electric driving motor, means for changing the circuit connections of the motor to apply an electro-dynamic braking effect thereto, an auxiliary motor, electrical connections between the circuits of the driving and auxiliary motors whereby the rotor of the latter is responsive in speed to conditions in the driving motor circuit and means controlled by the speed of said rotor for opening the circuit of the driving motor when its speed is reduced to a predetermined limit.

8. In combination, an induction driving motor, means for changing the circuit connections to supply a retarding current thereto, and an auxiliary motor having a rotor responsive in speed to the secondary frequency of the driving motor, and means controlled by the speed of said rotor for cutting off the supply of current to the driving motor when the speed is reduced substantially to zero.

9. In combination, an induction motor, means for applying a retarding current thereto, auxiliary control windings connected in circuit with the primary and secondary respectively of the motor, rotary means operated by said windings and contacts controlled by the speed of said rotary means for cutting off the retarding current.

10. In combination, an induction motor, auxiliary control windings connected in circuit with the primary and secondary respectively of the motor, rotary means operated by said auxiliary windings, means for changing the circuit connection of the motor to reverse its electro-dynamic torque, and means responsive to the speed of said rotary means for opening the motor circuit upon the deceleration of the motor to a predetermined limit.

11. In combination, an electric driving motor, an auxiliary rotary control motor connected in circuit therewith, a centrifugal switch operated by the rotor of the control motor, and means cooperating with said switch for applying a retarding current to the motor and for opening the motor circuit upon deceleration to a predetermined limit.

12. In combination, an induction driving motor, an auxiliary rotary motor responsive in speed to the secondary frequency of the driving motor, and a centrifugal switch operated by the auxiliary motor for controlling the circuit of the driving motor at a predetermined point of the speed of the driving motor.

13. In combination, an induction driving motor, means for changing its circuit connection to apply an electro-dynamic braking effect thereto, an auxiliary control motor connected to the secondary of the driving motor, and a centrifugal switch operated by the control motor for opening the circuit of the driving motor upon its deceleration substantially to zero.

14. In combination, an induction driving motor and means for applying a retarding current thereto and for cutting off the retarding current upon the deceleration of the motor to a predetermined limit, said means including a centrifugal switch and an auxiliary control motor responsive in speed to the secondary frequency of the driving motor for operating said switch.

15. In combination, an induction driving motor and means for applying a retarding current thereto and for cutting off the retarding current upon the deceleration of the motor to a predetermined limit, said means including a centrifugal switch and auxiliary motor means for operating said switch having two windings, one connected to the primary and the other to the secondary of the driving motor.

16. In combination, an induction driving motor, means including a centrifugal switch for applying a retarding current to the motor and for cutting it off upon the deceleration of the motor to a predetermined limit, and an auxiliary motor for operating the centrifugal switch and having two windings connected to the primary and secondary respectively of the driving motor and controlling the closing and opening respectively of the centrifugal switch.

17. In combination, an induction motor, forward and reversing switches therefor, a centrifugal switch controlling the operation of said reversing switch, and an auxiliary motor having two windings connected to the primary and secondary respectively of the driving motor for controlling the operation of the centrifugal switch.

18. In combination, an induction driving motor, electro-magnetic forward and reversing switches, a centrifugal switch, an auxiliary motor for operating the latter and provided with two windings, one having a normally closed connection with the primary of the driving motor and the other having a normally open connection with the secondary thereof and said windings controlling the closing and opening respectively of the centrifugal switch, means cooperating with the latter, when the forward switch is deenergized, for closing the circuit of the reversing switch, and means operating upon the closing of the reversing switch for changing the connections of the auxiliary motor windings, whereby the centrifugal switch is opened to deenergize the reversing switch when the driving motor decelerates substantially to zero.

19. In combination, an induction motor, starting and stopping controlling means therefor arranged in stopping condition to apply a retarding current to the motor primary circuit and to provide a predetermined resistance in its secondary circuit and an auxiliary motor having a rotor responsive in speed to the secondary frequency of the main motor for cutting off the retarding current.

THELMA I. DEKLE.